Sept. 20, 1955  C. G. PETTAS  2,718,211
AQUARIUM FEEDER
Filed Sept. 29, 1954
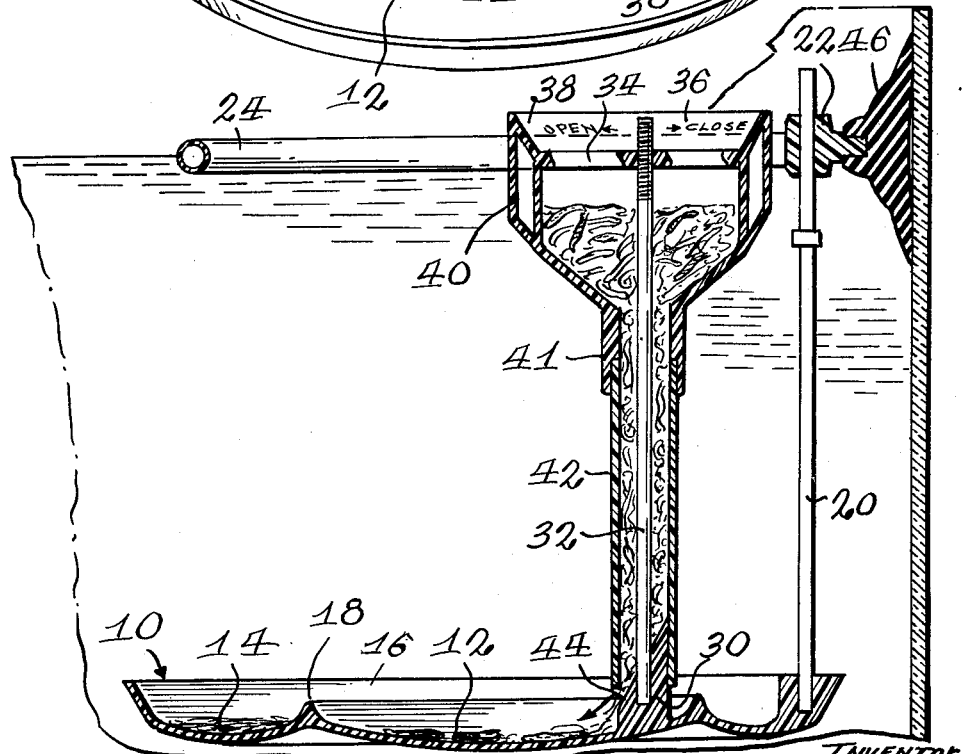

United States Patent Office 2,718,211
Patented Sept. 20, 1955

2,718,211
AQUARIUM FEEDER

Constant G. Pettas, Montreal, Quebec, Canada

Application September 29, 1954, Serial No. 459,161

10 Claims. (Cl. 119—51)

The present invention relates to equipment used in the care and feeding of fish, for example, tropical fish kept in aquariums.

There is one problem constantly bothering both the hobbyish and the professional fish collector with respect to the care and maintenance of aquariums in that the water and the soil or sand in the bottom of the aquarium frequently becomes dirty or cloudy thus endangering the lives of the fish and detracting from the appearance of the aquarium. A main reason for these unsatisfactory conditions is the rotting or spoiling of unused food which has a tendency to drop to the bottom of the aquarium and become buried in sand or lodged between rocks or pebbles placed within the aquarium. This material quite often instigates the growth of fungus or mould which is unsightly and further tends to cloud the water and in many cases gives it an unpleasant odour.

In order to overcome this problem there have been provided floating feeding rings which are placed on the surface of the water so that when dry food is placed within the aquarium, it is kept within a certain area so that any uneaten food, even when it becomes saturated and falls to the bottom will be at least localized so that it can be extracted without too much difficulty. However, this expedient does not completely overcome the problem outlined above since there is always a percentage of uneaten food which becomes lodged within the material placed in the base of the aquarium out of sight of the fish and out of reach of the usual cleaning means. Further, when wet food or a live food is used, the floating ring is of no use. When material of this type is placed within the aquarium it must be deposited in small quantities so that it is eaten completely by the fish. However, there is again always a quantity which escapes or drifts away from the fish and becomes embedded in the material in the base of the aquarium or is lost within the usual weeds planted within the aquarium.

The present invention recognizes this problem and aims to provide a fish feeding device whereby the possibility of any food escaping to become scattered about the aquarium, whether it be dry or wet, is eliminated.

Accordingly, the invention is an aquarium feeder which includes in combination, a floating ring adapted to keep dry food restricted to a definite location, a food catching tray and means whereby the tray is suspended beneath the floating ring so that any dry food which becomes saturated or is uneaten within the confines of the ring, and subsequently sinks, is caught on the tray. The connection between the ring and tray is maintained by an elongated rod, preferably of square cross section which is fixed to one peripheral edge of the tray and extends upwardly to a sliding connection with a sleeve provided on the outer periphery of the ring.

To provide a means for feeding wet food or live food, apart from the free swimming variety, there is also provided an automatic wet or live food feeder which can be adjusted to allow any desired quantity of wet food to be delivered in metered quantities to the central portion of the tray. This feeding device comprises of a top food containing chamber of substantially funnel-shaped outline which is provided with buoyant float chambers about its outer periphery. This food chamber includes at its lower end an elongated cylindrical tube which extends downwardly to fit over a truncated cylindrical base portion which is secured to one side of the central portion of the food catching tray. Adjustable connecting means are provided between the combined food chamber and tube and the base portion secured to the tray so that the end of the tube can be raised or lowered relative to the base portion. The raising of the cylindrical tube relative to the tray brings one peripheral edge of the bottom of the cylindrical feeding tube above the lower edge of the truncated portion of the base portion providing therebetween a food delivery opening. In use the food passes from the top chamber through the cylindrical tube and due to the angular slope of the truncated section slides across the face of the base portion through the opening and into the tray.

In the preferred construction the food retaining tray is formed so as to have an outer flange extending obliquely upwards from the bottom of the tray with a depressed centre portion and a further concentric outer depression between the centre portion and the peripheral flange. The juncture between the centre portion and the outer depression is defined by an upstanding flange so that in the case of wet or live food, for example, live worms or the like, if any of the food delivered to the centre portion of the tray is uneaten and tends to migrate towards the edge of the tray, it must first pass over the flange from the central recess and then due to the particular formation of the bottom of the tray falls into the second depression where it is again retained for consumption by the fish. Preferably, the upper floating ring, adjacent the juncture with the tray connecting rod is provided with a suction cup. This serves as a means of preventing the device from floating about the aquarium once the desired position has been determined.

Having thus generally described the nature of the invention, particular reference will be made to the accompanying drawings, wherein there is shown by way of illustration a preferred embodiment thereof, and in which:

Figure 1 is a view in perspective elevation of an aquarium feeder in accordance with the present invention.

Figure 2 is a cross sectional view of the construction shown in Figure 1 with the interior of the feeding chamber and food delivery tube being shown in more detail to more clearly illustrate the feeding action upon rotation.

With particular reference to the drawings, the preferred construction illustrated comprises of a base tray 10 having a central depression 12 and a concentric outer depression 14 surrounded by an upstanding annular flange 16. The depressions 12 and 14 are defined by an upstanding flange 18 so that any live food deposited on the tray is contained first of all in the central depression 12 and if it tends to migrate is again trapped in the depression 14. A standard or rod 20 extends from the rear portion of the tray upwardly to a sliding connection with a sleeve 22 provided on a floating ring 24. The standard 20 is preferably of square cross section as is the opening in the sleeve 22 so that the ring 24 in the tray 10 are maintained in alignment with each other, the ring 24 being of hollow tubular formation to provide the buoyancy required to keep it on the surface of the water at all times irrespective of the relative position of the tray 10.

On the tray 10, within the central depression 12 there is provided a truncated cylindrical extension 30 which serves as a base and a locating member for the wet or live food feeding portion of the apparatus. An elongated rod 32 is secured centrally of the base member 30 so as to extend upwardly therefrom. The upper end of the rod 32 is threaded and is threadably engaged with a cross member 34 extending across the open mouth of a substantially funnel-shaped food containing and delivery chamber 36. The food chamber open top is provided with outwardly flaring marginal edges 38 and integral buoyancy chambers 40. The buoyancy chambers 40 are of sufficient dimensions to completely float the entire feeding arrangement including the tray 10 so that as the level of the water in the aquarium varies, the upper rim of the food chamber is maintained above the surface of the water. The lower end 41 of the member 36 is connected directly to a cylindrical food delivery tube 42, the lower end of which slidably fits over the base member 30 of the tray.

With this arrangement, rotation of the food containing chamber 36 in one direction, through the threaded engagement with the rod 32, brings the lower end of the tube 42 away from the tray base portion 12. This upward motion clears the lower end of the tube 42 from the lower edge of the truncated side 44 of the base member 30, thus providing a food delivery passage or slot. As will be appreciated, the size of this slot can be regulated by the further rotation of the top food chamber 36. Rotation of the chamber 36 in the opposite direction causes the chamber 36 and attached tube 42 to descend relative to the base member 30, thus closing the slot and preventing delivery of food from the upper chamber 36. In the preferred construction shown, a suction cup 46 is attached to the ring sleeve 22 so as to provide a means of conveniently locating the feeding apparatus once placed in the aquarium. The suction cup 46 is merely for the purpose of providing a means for anchoring the device temporarily to any desired wall of the aquarium and it does not help to keep the feeder supported in the water.

The tray 10 is slightly greater in area than the ring 24 so as to ensure the catching of any food dropping from within the confines of the ring. In the construction illustrated the various portions are shown as being moulded from suitable plastic material so that the buoyancy chambers 40 are integral with the chamber 36. It will be appreciated that other materials might be employed and in which case the buoyancy could be accomplished by separate flotation members secured to the wet food feeding portion of the apparatus.

Operation

In use, the device is placed in the aquarium and by the floating ring 24 it is maintained at the water level with the tray 10 of course being submerged directly beneath the food retaining ring. Once located in the desired position, application of the suction cup 46 against the side of the aquarium will keep the apparatus in place.

The dry food is placed on the surface of the water within the confines of the ring 24 and is thus prevented from floating out into the body of the aquarium. Wet food, for example worms or the like is placed in the funnel-shaped main body of the chamber 36 and the tube 42 is adjusted relative to the base 30, through the screw arrangement described, so as to permit the desired quantity of wet food to enter onto the central portion 12 of the tray 10.

Uneaten dry food which becomes saturated and sinks beneath the water level will of course be caught on the tray 10 while any uneaten wet food, if dead, will be left in the central portion of the tray, and if live, will not be liable to migrate beyond the confines of the second depression 14 and over the flange 16 and thus will also be maintained on the tray readily accessibly to the fish.

As will be appreciated, by reference to the preceding description of the accompanying drawings, the main advantage of the present apparatus is that no food is allowed to escape into the general aquarium area but is controlled and kept within predetermined confines, specifically the tray 10 so that any food uneaten is left in a position where fish can see it and eventually consume it. Thus, the possibility of uneaten food escaping to the bottom of the aquarium beyond the reach of the fish or cleaning is eliminated.

I claim:

1. An aquarium feeder comprising in combination, a first buoyant food retaining member formed to constitute a continuous floating wall adapted to surround a portion of the surface area of the water within an aquarium, a food catching tray disposed in vertical spaced apart relationship beneath said tray in a position to catch any food descending from within said floating wall, a connecting member between said food retaining member and tray to retain said member and tray in register, a second food retaining member having an upper food containing and dispensing portion provided with floatation means and a lower dependant food delivery portion of tubular formation leading to said tray, and adjustable connecting means between said second food retaining member and tray whereby the spacing between the lower end of said food delivery tube and tray may be varied to control the amount of food delivered to said tray from said second food retaining member.

2. An aquarium feeder as claimed in claim 1, wherein said first food retaining member is of annular formation and said second food retaining member's upper portion is of substantially funnel-shaped outline.

3. An aquarium feeder as claimed in claim 1, wherein there is provided a food delivery tube and guiding member of truncated cylindrical form, said member being secured to said tray so as to extend upwardly therefrom and said connecting means between said second food retaining member and tray comprises an elongated rod having one end secured to said tube locating member and extending upwardly therefrom through said food delivery tube to a threaded connection with said upper portion of said second food retaining member.

4. An aquarium feeder as claimed in claim 1, including a suction cup attached to said first buoyant food retaining member whereby said feeder assembly may be anchored to a wall of an aquarium.

5. An aquarium feeder as claimed in claim 1 wherein said connecting member between said first food retaining member and said tray comprises an elongated rod of rectangular cross section having one end fixed to said tray with the other end slidably engaging a rod mounting sleeve secured to one marginal edge of said first food retaining member.

6. An aquarium feeder as claimed in claim 1, wherein said food catching tray is formed to have an outline substantially corresponding to the outline of said first food retaining member's floating wall and is provided with an upstanding annular flange surrounding the outer periphery of said tray and extending beyond said food retaining member outline on all sides, the bottom portion of said tray being provided with concentric food retaining channels.

7. An aquarium feeder comprising in combination, a continuous outer wall having inner buoyant chambers and being adapted to contain a portion of the water within an aquarium, a food retaining member connected to and disposed within the confines of said outer wall, a food catching tray disposed in vertical spaced apart relationship from said outer wall and said food retaining member and having outer dimensions greater than said outer wall, an adjustable connecting member between said food retaining member and tray to retain said member and tray in register, a food delivery tube connected to said food retaining member and extending therefrom to adjacent said tray, whereby the spacing between the lower end of said food delivery tube and tray may be varied by said adjustable connecting member to control the amount of food delivered to said tray from said food retaining member.

8. An aquarium feeder as claimed in claim 7 wherein said continuous outer wall is of circular outline and said food retaining member is of tapering conical outline.

9. An aquarium feeder as claimed in claim 7, wherein there is provided a food delivery tube and guiding member of truncated cylindrical form, said member being secured to said tray so as to extend upwardly therefrom and said adjustable connecting means between said food retaining member and tray comprises an elongated rod having one end secured to said tube locating member and extending upwardly therefrom through said food delivery tube to a threaded connection with said food retaining member.

10. An aquarium feeder as claimed in claim 7, including a suction cup attached to said continuous outer wall whereby said feeder assembly may be anchored to a wall of an aquarium.

References Cited in the file of this patent

UNITED STATES PATENTS

| | | |
|---|---|---|
| 1,976,962 | Pape | Oct. 16, 1934 |
| 2,522,634 | Pittenger | Sept. 19, 1950 |
| 2,576,154 | Trautvetter | Nov. 27, 1951 |
| 2,583,911 | Webster | Jan. 29, 1952 |

FOREIGN PATENTS

| | | |
|---|---|---|
| 143,395 | Germany | Aug. 15, 1903 |